United States Patent [19]

Jackson et al.

[11] 4,418,850
[45] Dec. 6, 1983

[54] PANNIER AND MOUNTING ARRANGEMENT FOR CYCLES

[76] Inventors: W. Shaun Jackson, 809 Sycamore, Ann Arbor, Mich. 48104; Leslie E. Bohm, 29560 Rutherland, North, Southfield, Mich. 48076

[21] Appl. No.: 339,273

[22] Filed: Jan. 15, 1982

Related U.S. Application Data

[63] Continuation of Ser. No. 84,400, Oct. 24, 1979, abandoned, Continuation-in-part of Ser. No. 768,467, Feb. 14, 1977, Pat. No. 4,174,795.

[51] Int. Cl.³ .............................................. B62J 9/00
[52] U.S. Cl. .............................. 224/32 A; 24/230 BC; 150/49; 224/33 R; 248/223.4; 403/362
[58] Field of Search ............... 224/32 A, 33 R, 32 R, 224/39; 150/49, 1; 248/223.4, 224.3, 226.5, 316 D, 316 E; 24/230 BC; 280/289, 769; 403/362; 285/90

[56] References Cited

U.S. PATENT DOCUMENTS

| | | | |
|---|---|---|---|
| 796,414 | 8/1905 | Chayes | 24/230 BC |
| 799,963 | 9/1905 | Baldwin | 403/362 X |
| 2,300,219 | 10/1942 | Hannum | 403/362 X |
| 2,423,003 | 6/1947 | Buegeleisen | 224/32 R |
| 2,428,906 | 10/1947 | Cannella | 294/145 |
| 2,956,324 | 10/1960 | Klein | 24/230 BC |
| 3,145,408 | 8/1964 | Hertzel et al. | 150/49 X |
| 3,406,885 | 10/1968 | Zurmuhlen | 224/32 R X |
| 3,716,938 | 2/1973 | Ammons | 150/49 X |
| 3,786,972 | 1/1974 | Alley | 224/32 A |
| 3,875,623 | 4/1975 | Johnston | 24/230 BC |

FOREIGN PATENT DOCUMENTS

| | | | |
|---|---|---|---|
| 599075 | 6/1934 | Fed. Rep. of Germany | 224/32 A |
| 82237 | 2/1956 | Netherlands | 224/32 R |
| 242067 | 4/1946 | Switzerland | 224/32 A |
| 584835 | 1/1947 | United Kingdom | 224/32 A |
| 614967 | 12/1948 | United Kingdom | 224/32 A |
| 734278 | 7/1955 | United Kingdom | 224/32 A |

Primary Examiner—Allan N. Shoap
Attorney, Agent, or Firm—Krass, Young & Schivley

[57] ABSTRACT

A pannier adapted to be mounted on the rear carrier rack of cycle vehicles includes a rectangular bag mounted on a flat, rigid frame and a U-shaped bar pivotally mounted on the frame and within the bag to permit collapsing of the bag. The pannier is mounted on the rack by an elongated rod extending across the upper edge of the frame and adapted to be slidably received within a channel section of the rack. A pair of snaps carried by a pannier flap secure and position the pannier, fore and aft, against shifting movement with respect to the channel section. The lower end of the pannier is secured by means of a webbing loop mating with a wire form which is bolted to a portion of the carrier rack support and which has a rear-projecting section. The rear-projecting section slides into the webbing loop simultaneously with movement of the rod element into the channel section.

4 Claims, 8 Drawing Figures

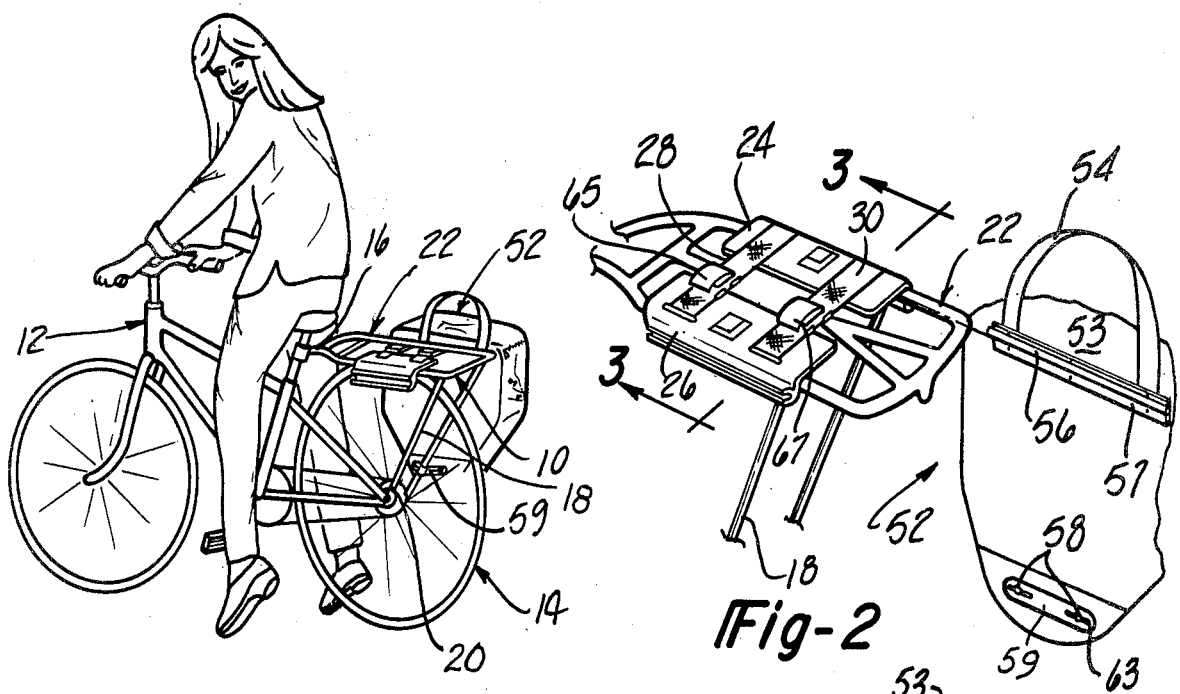
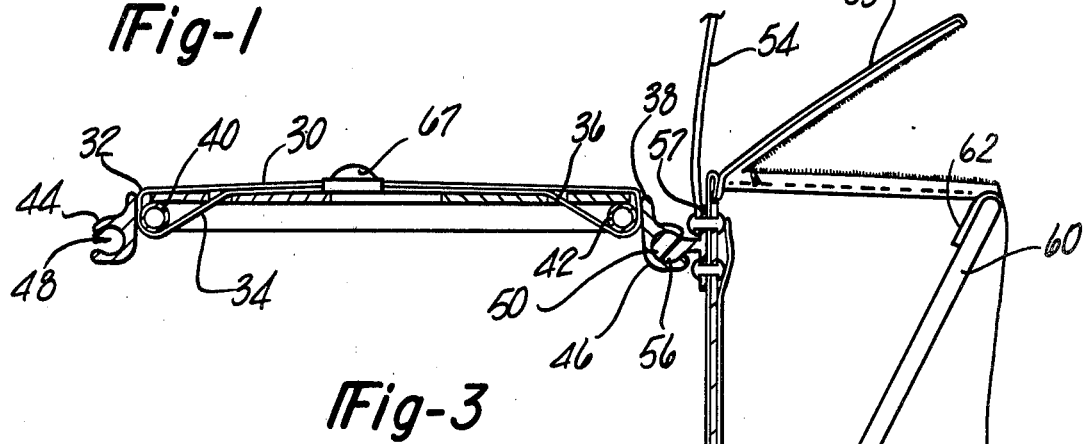
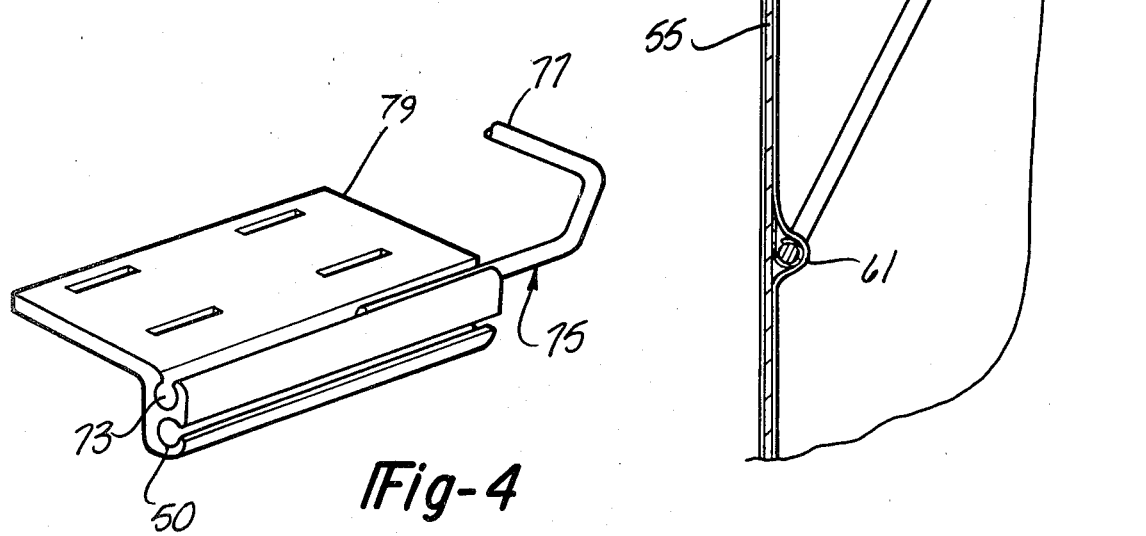

PANNIER AND MOUNTING ARRANGEMENT FOR CYCLES

This application is a continuation of application Ser. No. 84,400, filed Oct. 24, 1979, now abandoned, which is a continuation-in-part of Ser. No. 768,467, filed Feb. 14, 1977, now U.S. Pat. No. 4,174,795, issued Nov. 20, 1979.

BACKGROUND OF THE INVENTION

1. Field of the Invention

This invention relates to panniers adapted to be mounted to cycle vehicles at the side of the rear wheel and to mounting arrangements for such panniers.

2. Reference to Related Applications

This application is a continuation-in-part of application Ser. No. 768,467, filed Feb. 14, 1977 entitled "Pannier Mounting Arrangement for Cycles".

3. Brief Description of the Prior Art

Panniers for bicycles, motorcycles and the like are usually attached to the cycle carrier racks by means such as loops, springs, snaps, etc. which provide for encirclement of structural members of the rear carrier rack. Difficulties encountered with this approach include the vulnerability of the attachment hardware, which have a tendency to fail when loaded heavily, to fall off, or to get lost. The strength of such an attachment method is also compromised by the point concentration of the load creating a tendency for the bag to tear or the straps or hardware, etc. to fail. Many of such systems are also relatively cumbersome in carrying out installation of the pannier which is a substantial disadvantage, since the pannier may be utilized as detachable luggage with frequent removal and installation thereof in the course of a tour. Another drawback is encountered in those systems in which the pannier is supported by means of loops encircling structural members of the carrier rack in that this would allow a certain amount of fore and aft shifting and mispositioning of the pannier.

While any such mounting system should be preferably very strong and capable of supporting a heavily loaded pannier, weight considerations preclude the use of heavy mounting components. While panniers are often mounted in pairs on either side of the cycle rear wheel, it is very desirable that the panniers be capable of being independently installed and removed to provide flexibility in their use.

In addition the carrier rack itself should preferably be very sturdily supported to provide lateral or anti-sway stability, so as to adequately resist tendencies of the pannier to shift laterally when heavily loaded during turning movements.

Another desirable feature of carrier racks is the ease with which they may be adapted to cycle vehicles of various sizes and configurations in order that numerous models of the carrier rack are not necessitated. The pannier itself should be flexible so that it can accommodate loads of various configurations and be compactly folded when not in use, yet should have sufficient shape to allow easy loading and unloading.

It is therefore an object of the present invention to provide such a pannier and a mounting arrangement for mounting such panniers to carrier racks, which does not involve the use of complicated fasteners or other components and which subject the pannier to concentrated loads.

It is yet another object of the present invention to provide such a mounting arrangement which permits precise and secure fore and aft positioning of the panniers with respect to the carrier rack.

It is yet another object of the present invention to provide such a mounting arrangement in which the pannier may be attached or removed in seconds and in which pannier pairs may be installed and removed independently of one another.

It is still another object of the present invention to provide such a mounting arrangement which is simple and light weight and while providing a very strong support capable of supporting heavily loaded panniers.

Another object of the present invention is to provide a specially designed carrier rack for incorporating such a mounting arrangement, which is adaptable to widely varying cycle frame sizes and configurations and which provides a stable support for the panniers.

SUMMARY OF THE INVENTION

These and other objects of the present invention which will become apparent upon a reading of the following specification and claims are accomplished by the provision of a pannier taking the form of a generally rectangular bag having an open top and a rigid stiffening frame on its rear side. A U-shaped bar has its two ends pivotally supported to points on opposed sides of the stiffening frame, midway along the length of the frame, so as to normally project forwardly and upwardly therefrom at an inclined angle with respect to the frame. The central section of the pivotal bar is encased in the top forward edge of the bag so that when the bar extends outwardly it supports the top of the bag in an open manner. When subjected to side forces the bar can pivot upwardly to prevent damage to the pannier. It can also be folded upwardly, so as to be parallel to the back frame, for storage purposes. The mounting arrangement for the pannier includes an elongated rod extending along an upper edge of the pannier which rod is adapted to be received within a channel section formed either on track sections secured to an existing carrier rack or integrally formed in a specially configured carrier rack horizontal platform to provide a slide-on mount which distributes the load across the entire upper edge of the pannier. The bottom portion of the pannier is secured with a webbing loop to a support bracket to stabilize the lower portion of the pannier. The mounting arrangement is readily adaptable to other luggage items by the expedient of securing a similar support rod along a longitudinal edge of the luggage item.

The carrier rack incorporating the mounting arrangement includes a horizontal platform slidably receiving a pair of rear extension rod members, which allow adjustability in length of the horizontal platform, and by clamping means pivotally mounted to the outer end of each rear extension rod member, the attachment of the horizontal platform to widely varying frame configurations is facilitated. Vertical support for the horizontal platform is provided by bracketry means including a plurality of strut members extending downwardly from the horizontal platform to a point of attachment to the cycle frame, a set of the strut members disposed on either side of the horizontal platform to straddle the cycle rear wheel. Two of the strut members in each set extend from a point along the side of the horizontal platform and converge together to define a pannier support plane, roughly triangular in shape, while a third strut extends from a point on the horizontal platform spaced inwardly from the horizontal platform side to provide a lateral or anti-sway brace stabilizing the horizontal platform against side-to-side movements. The horizontal platform includes parallel extending upper and lower channel sections formed along either side thereof, with the upper channels receiving the front extension rod members and also a rear platform extension including a pair of rod ends adapted to be received within the upper channel sections opposite the front extension rod members. The lower channel sections on either side are adapted to perform the rod receiving function of the pannier mounting arrangement according to the present invention.

DESCRIPTION OF THE DRAWINGS

FIG. 1 is a perspective view of a bicycle with a pannier mounted to the rear carrier rack of an existing rear carrier rack by the mounting arrangement of the present invention;

FIG. 2 is an enlarged perspective view of the rear carrier rack, shown on the bicycle of FIG. 1, with the pannier bag positioned ready to be installed thereon;

FIG. 3 is a view of the section 3—3 taken through the carrier rack, shown in FIG. 2, with the pannier in place on the rack;

FIG. 4 is a perspective view of an alternate embodiment of the track sections included in the mounting arrangement shown in FIGS. 1 through 3;

DETAILED DESCRIPTION

Figure 5:
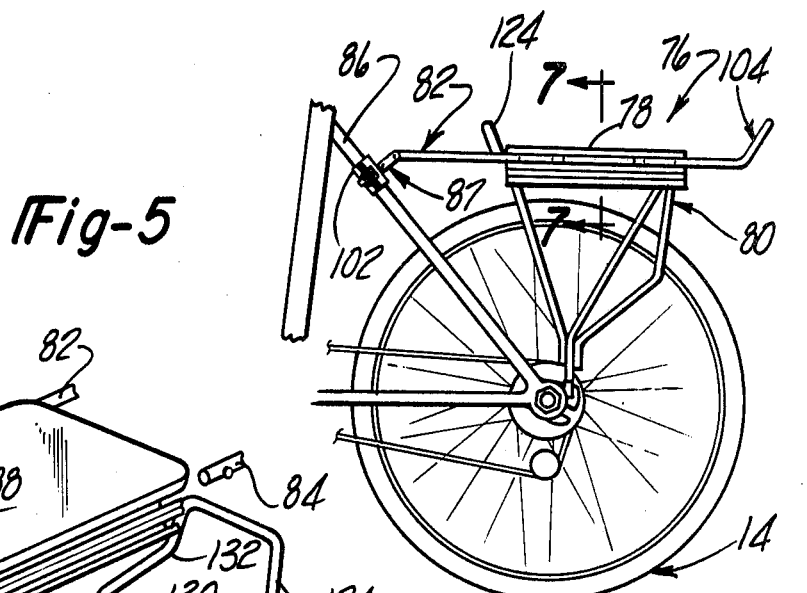
FIG. 5 is a partial view of a bicycle having installed a rear carrier rack especially adapted to the pannier mounting arrangement according to the present invention.

Referring to the drawings and particularly FIGS. 1 through 5, a version of the mounting arrangement according to the present invention is disclosed adapted to be added to an existing rear carrier rack 10 commonly provided on cycle vehicles such as the bicycle 12 shown in FIG. 1, the rear carrier rack 10 extending over the rear wheel 14 of the bicycle. The rear carrier rack 10 is typically secured to the bicycle by a clamp 16 encircling the seat mast and by downwardly extending bracketry 18 connected to the bicycle frame in the vicinity of the bicycle rear wheel axle 20. The rear carrier rack 10 includes a horizontal platform, typically formed of a welded tube structure of the type shown in FIGS. 1 and 2.

The pannier mounting arrangement according to the present invention includes a pair of track sections 24 and 26 mounted on either side of the carrier rack 10 by being strapped with straps 28 and 30 to the carrier rack horizontal platform 22. The straps 28 and 30 are looped through slots 32 and 34, and 36 and 38 respectively, provided in the track sections 24 and 26 and passed around tubing members 40 and 42, which comprise a portion of the horizontal platform 22, to thus securely retain the track sections 24 and 26. Velcro patches or other suitable retainers (not shown) are provided to secure the straps 28 and 30.

Each track section 24 and 26 includes a channel section 44 and 46 respectively, extending alongside the horizontal platform 22 when the track section 24 and 26 are installed thereon. Each channel section 44 and 46 includes a channel opening 48 and 50.

The pannier of the present invention, generally indicated at 52, consists of a generally rectangular fabric bag having a tapered bottom and a rectangular open top which may be closed by means of a zippered flap 53, extending from the rear upper edge of the bag. A handle 54 attaches to the opposed corners of the upper rear edge of the bag to allow handling when not on the bicycle. The entire rear of the bag is formed with a flat stiffener panel 55 which may be formed of aluminum, fiberboard, or a like lightweight material.

A plastic rod section 56 is riveted to the rear of the bag 52, below its upper edge, through means of a base structure 57. The rod 56 projects horizontally and is adapted to slip into one of the channel section openings, 48 or 50, by a longitudinal movement, to secure the pannier to the bicycle.

The lower end of the rear of the bag carries a pair of horizontally spaced projecting rivets 58 which retain a flexible strap 59 preferably formed of rubber, neoprene or like material. The strap has a pair of slits 63 formed in its opposed ends so that they may be passed over the button heads of the rivets 58. Strap 59 allows the lower end of the bag to be secured about the bottom end of the downwardly extending bracketry 18 of the carrier 10. The underside of the strap 59 may be grooved to better grip the bracketry. The strap constitutes a secondary means for securing the bag against longitudinal movement once it is fixed on the carrier.

A U-shaped hold-open bar 60 has its ends pivotally secured to the forward face of the panel 55. at opposed points in the opposite edges of the board, midway along its height. The securements constitute journals 61 which are preferably formed by upsetting strips of the panel material 55. The central horizontal section of the bar is encased in a tubular sleeve 62 formed on the top forward edge of the bag. In the absence of the bar 60 the forces imposed upon the bag by objects carried within the bag would tend to collapse the bag laterally against its rigid rear surface, making it dufficult to place additional articles into or remove articles from the bag. The bar 60 maintains the bag in an opened position by converting the downwardly directed tensile forces imposed on the side of the bag by loading into tensile forces on the top, side edges of the bag. These edges, along with the sides of the bar and the interconnecting sections of the panel 55 act as triangular supports for the bag.

The bar 60 may be pivoted upwardly to fold the bag or when lateral forces are imposed on the bag accidentally.

It can be appreciated that this arrangement accomplishes the aims of the present invention inasmuch as the hardware involved is minimal and is securely retained in the system so that the elements thereof are not apt to get lost.

The support for the weight of pannier 52 and its contents is along the entire length of the rod element 56 so as to very adequately distribute the load and reduce the strain imposed on the components to a relatively low level, even when the pannier 52 is heavily loaded.

In alternative forms of the system the channel section member could be attached to the pannier while the rod member could be attached to the carrier. The combination of a female channel section and a male rod section which interlock with a longitudinal motion will be hereinafter referred to as a "longitudinal slide lock".

Referring to FIG. 4, an alternate embodiment of the track sections 24 and 26 is shown, in which an additional channel opening 73 is provided extended along but above the pannier mounting channel opening 50, as shown. This would provide for installation of front or rear extension rods 75, or both to provide an elevated cross rod 77 acting as a load retention means for items mounted to the horizontal platform 79.

Figure 6:
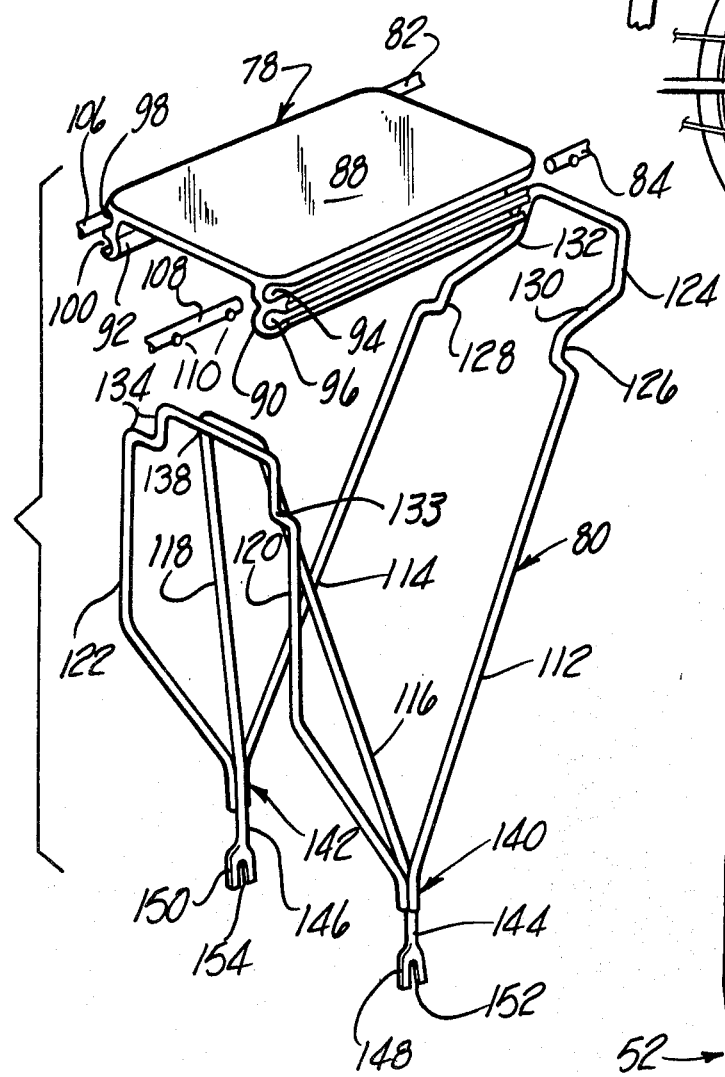
FIG. 6 is an exploded perspective view of the carrier rack structure shown in FIG. 5.
Figure 7:
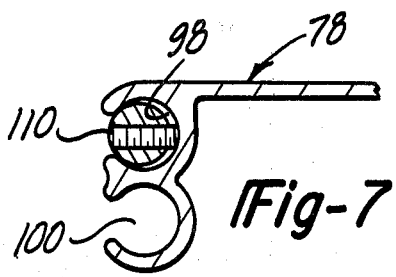
FIG. 7 is a sectional view of the section 8—8 taken in FIG. 5.
Figure 8:
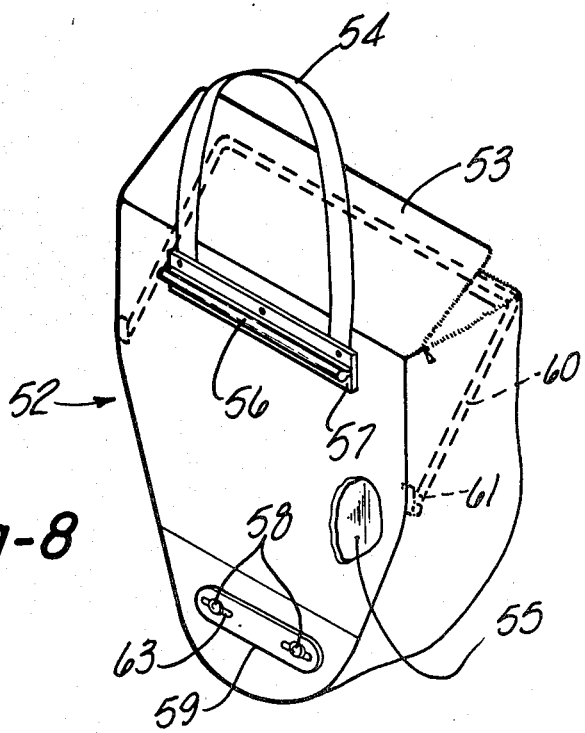
FIG. 8 is a perspective view of the pannier of the present invention partially broken away for purposes of illustration.

Referring to FIGS. 5 through 7, a carrier rack 76 is depicted which integrally incorporates the mounting arrangement according to the present invention and which in addition is adaptable to bicycle frame structures of widely varying configurations and sizes, and which features extremely stable supporting bracketry which resist the lateral loads imposed by a heavily loaded pannier. The carrier rack 76 includes a horizontally extending platform 78 which is positioned over the rear cycle wheel 14 by bracket means 80 providing vertical support for the horizontal platform 78 and a pair of front extension rods 82 and 84 secured to the bicycle frame structure 86 acting in cooperation with the bracket means 80 to provide secure positioning of the horizontal platform 78 on the bicycle frame.

The horizontal platform 78 may be formed by an aluminum extrusion having an upper planar surface 88 and downwardly extending side portions 90 and 92, each of which are formed with channels 94, 96 and 98 and 100, respectively. The upper channels 94 and 98 receive at the front end thereof a pair of front extension rods 82 and 84 which are slidable therein so as to provide a length adjustment of the horizontal platform 78 and to allow extension thereof to be positioned with respect to the bicycle frame member 86. Each of the front extension rods 82 and 84 have pivotally mounted thereto clamping attachments 102 such as is shown with respect to extension rod 82. The clamping attachments 102 are pinned to the outer end of the front extension rod 82 by a clevis 87 so as to allow pivotal adjustment of the clamping means to properly be positioned with respect to the frame member 86 through a range of bicycle frame configurations.

At the other end of the channels 94 and 98 a rear extension bracket 104 is provided having ends 106 and 108 slidably received within the respective channels 98 and 94 and adjustable therein. Both the front extension members 82 and the end portions 106 and 108 are secured in any adjusted position by means of set screws 110, as shown in FIG. 7, passing transversely through the respective rods and into engagement with the interior wall of the channel section.

The bracket means 80 is comprised of a plurality of downwardly extending struts 112, 114, 116, 118, 120 and 122. Struts 112, 116 and 120 form one strut set, and struts 114, 118 and 122 form another strut set, each strut set disposed on either side of the rear bicycle wheel 14, straddling the same.

Struts 112 and 114 are joined at their upper ends by an upwardly projecting U-portion 124 which also will act as a frontal load retention projection. Each of the downwardly extending struts 112 and 114 have offset sections 126 and 128 which locate horizontally extending sections 130 and 132 so as to fit within the underside of the horizontal platform member 78 and are secured to the underside thereof by welding or other suitable means. Struts 120 and 122 have similar offset sections 133 and 134 which position a transverse section 138 to similarly fit within the horizontal platform member 78 and be secured to the undersurface thereof by welding or other suitable means. The downwardly extending strut sets 112, 116, 120 and 114, 118, 122 converge at their lower ends and are welded together at 140 and 142. Strut members 116 and 118 have a downwardly extending projection portion 144 and 146 each having a swaged end portion 148 and 150, respectively, with a slot 152 and 154 formed therein, adapted to receive bolts 156 secured to the cycle frame structure to thereby secure the bracket means 80 to the bicycle frame.

Strut pairs 112 and 120 and 114 and 122, respectively, provide roughly triangular pannier support planes by being positioned on either side of the horizontal platform 78 to engage and provide lateral support for the interior sides of the pannier 52. The strut members 116 and 118 extend downwardly from the horizontal platform 78 from a position inward of the side portions 90 and 92 of the horizontal platform 78 by virtue of being welded to the transverse section 138 of the strut members 120 and 122, as shown in FIG.6, to form a stabilizer triangle with respect to the plane of the aforementioned strut pairs. The struts 116 and 118 thus resist any tendency for the assemblage to sway under the influence of turning movements of the bicycle when the panniers 52 are heavily loaded.

The front extension rods 82 and 84 allow the carrier rack structure 76 to be adapted to bicycle or motorcycle frames of various sizes and configurations without any necessity of redesign of the carrier rack geometry, since the horizontal platform 78 can be positioned in a horizontal attitude with varying locations of the frame member 86. This is done at installation by first mounting the clevised ends 148 and 150 to the bicycle frame, and by extending the front extension rods 82 and 84 forwardly and pivoting the clamping attachments 102 to allow proper securement to the bicycle frame members 86.

The resulting structure is extremely rigid and resists loads in all directions imposed by the panniers 52, even when the panniers 52 are heavily loaded by the provision of the bracing struts 116 and 118 resisting such swaying movements. This considerable rigidity has been achieved without the use of massive framing members or other components to provide a lightweight carrier rack.

The embodiments of the invention in which an exclusive property or privilege is claimed are defined as follows:

1. A pannier adapted to be secured to the side of a cycle vehicle, said vehicle including a longitudinally extending fastener on the side thereof for mounting said pannier on said vehicle, comprising:

a generally rectangular bag formed of flexible sheet material, said bag having a top provided with an access opening therein and a plurality of sidewalls, and a flap pivotally joined to one of the sidewalls along a hinge line for selectively covering the access opening;

a substantially rigid panel disposed within said bag and secured to one of the sidewalls of said bag, the upper extremity of said panel being disposed below said hinge line;

a generally U-shaped bar disposed within said bag and having the opposite ends thereof pivotally mounted on one side of said panel at a location spaced below said top of said bag, said bar having an intermediate section secured to another of said sidewalls adjacent said top, said bar extending upwardly and outwardly from said panel whereby to maintain said top of said bag in an extended position, said bar being pivotable toward said panel to hold said top of said bag into a retracted position; and a longitudinally oriented, elongate slide member secured to the other side of said panel adjacent said top of said bag, said slide member extending laterally from said bag and matingly engaging said slide fastener for suspending said bag on said vehicle, essentially the entire weight of the pannier being distributed along the length of said slide member.

2. The pannier of claim 1, wherein said elongate slide member includes an elongate rod having a convex cross section, said rod being slidably received by slide fastener.

3. The pannier of claim 1, including means secured to said other side of said panel and spaced below said slide member for securing lower portions of said pannier to said vehicle.

4. A pannier assembly for a cycle vehicle having a carrier mounted thereon, comprising:

a generally rectangular bag formed of flexible sheet material, said bag having a top provided with an opening therein through which access may be gained to the interior of said bag, said bag having an inner sidewall and an outer sidewall opposing said inner sidewall, said bag further having a closure pivotally connected to said inner sidewall along a hinge line at the top of said bag for selectively covering said opening;

a substantially rigid panel disposed within said bag, and secured to said inner sidewall, the upper extremity of said panel being disposed below said hinge line;

a generally U-shaped member disposed within said bag, said U-shaped member including a pair of legs and an intermediate section connecting said legs, one end of each of said legs being pivotally mounted on one side of said panel at a location spaced below said top of said bag, said intermediate section being secured to said outer sidewall adjacent said top, said U-shaped member being pivotable relative to said panel between a first position in which said intermediate section holds said outer side wall adjacent said top in a laterally extended position relative to said panel, and a second position in which said intermediate section holds said outer wall adjacent said top in a laterally retracted position relative to said panel; and a fastening assembly for fastening said pannier on said carrier, said fastening assembly including (2) a first elongate, longitudinally extending slide member on said carrier, and (2) a second elongate, longitudinally extending slide member mounted on the other side of said panel adjacent said top of said bag, said second slide member being slidably interengagable with said first slide member.

* * * * *

UNITED STATES PATENT AND TRADEMARK OFFICE
CERTIFICATE OF CORRECTION

PATENT NO. : 4,418,850

DATED : December 6, 1983

INVENTOR(S) : W. Shaun Jackson et al.

It is certified that error appears in the above-identified patent and that said Letters Patent is hereby corrected as shown below:

Column 4, line 44, "dufficult" should read -- difficult --.

Column 8, line 24, "(2)" should read -- (1) --.

Signed and Sealed this

Twenty-fourth Day of July 1984

[SEAL]

*Attest:*

GERALD J. MOSSINGHOFF

*Attesting Officer*   *Commissioner of Patents and Trademarks*